(12) United States Patent
Chin et al.

(10) Patent No.: US 7,361,291 B2
(45) Date of Patent: Apr. 22, 2008

(54) ANTISTATIC COMPOSITION

(75) Inventors: Hui Chin, Katonah, NY (US); Christopher J. Fagouri, Lake Orion, MI (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 548 days.

(21) Appl. No.: 10/761,821

(22) Filed: Jan. 21, 2004

(65) Prior Publication Data

US 2004/0171762 A1    Sep. 2, 2004

Related U.S. Application Data

(60) Provisional application No. 60/442,636, filed on Jan. 24, 2003.

(51) Int. Cl.
*H01B 1/20* (2006.01)
*C08K 5/20* (2006.01)

(52) U.S. Cl. ............... 252/511; 252/510; 252/8.61; 524/103; 524/436; 524/606; 524/910; 524/913; 524/226; 428/364; 428/375; 428/474.4; 428/480; 428/516; 428/922

(58) Field of Classification Search ............... 252/500, 252/511, 510, 8.61, 8.91, 8.81, 520.1; 524/405, 524/423, 436, 606, 910–913; 428/317.9, 428/516
See application file for complete search history.

(56) References Cited

U.S. PATENT DOCUMENTS

| 3,839,245 | A |   | 10/1974 | Schlossman et al. ......... 260/18 |
| 4,230,838 | A |   | 10/1980 | Foy et al. .................... 525/408 |
| 4,264,667 | A | * | 4/1981  | Murakami et al. ........ 428/195.1 |
| 4,332,920 | A |   | 6/1982  | Foy et al. .................... 525/408 |
| 5,064,284 | A | * | 11/1991 | Johnston et al. ............ 356/121 |
| 5,096,995 | A |   | 3/1992  | Fukumoto et al. ........... 528/125 |
| 5,140,065 | A |   | 8/1992  | Dalla Torre et al. .......... 525/66 |
| 5,306,549 | A | * | 4/1994  | Isozaki et al. ............... 428/220 |
| 5,604,284 | A |   | 2/1997  | Ueda et al. .................. 524/434 |
| 5,652,326 | A |   | 7/1997  | Ueda et al. .................. 528/288 |
| 5,654,096 | A | * | 8/1997  | Yamada et al. .............. 428/373 |
| 5,849,822 | A | * | 12/1998 | Kido et al. ................... 524/159 |
| 5,886,098 | A |   | 3/1999  | Ueda et al. .................... 525/66 |
| 5,965,206 | A | * | 10/1999 | Hilti et al. ................ 427/393.1 |
| 6,162,545 | A | * | 12/2000 | Kamiyama et al. .......... 428/412 |
| 6,551,671 | B1 | * | 4/2003 | Nishizawa et al. ........ 428/34.1 |
| 2003/0072935 | A1 | * | 4/2003 | Iwasa et al. .............. 428/317.9 |

FOREIGN PATENT DOCUMENTS

| GB | 1518060 | 7/1978 |
| GB | 2112789 | 7/1983 |
| GB | 2112795 | 7/1983 |
| JP | 05-148768 | * 6/1993 |
| JP | 0613919 A1 | * 9/1994 |
| JP | 2000212834 | 8/2000 |
| JP | 2000212836 | 8/2000 |
| JP | 2000226749 | 8/2000 |
| WO | 02/055411 | 7/2002 |

OTHER PUBLICATIONS

Patent Abstracts of Japan Publication No. 09040855 (1997), no month.
English language abstract for JP 2000226749 (2000), no month.
English language abstract for JP 2000212836 (2000), no month.
English language abstract for JP 2000212834 (2000), no month.
R. Gächter et al., Plastics Additives Handbook, 4th Edition, (1993), pp. 749-773, no month.

* cited by examiner

*Primary Examiner*—Stuart L. Hendrickson
*Assistant Examiner*—Kallambella Vijayakumar
(74) *Attorney, Agent, or Firm*—Tyler A. Stevenson

(57) ABSTRACT

Polymer compositions comprising
  a) a polymer substrate selected from the group consisting of the polyolefins, polyesters, polyamides and polylactic acids and
  b) a combination of
    i) at least one permanent antistatic additive selected from the group consisting of the polyetheresteramides and
    ii) at least one migratory antistatic additive selected from the group consisting of the alkylsulfonic acid salts, the alkyl diethanolamines and the alkyl diethanolamides,
are effectively antistatic.

19 Claims, No Drawings

ANTISTATIC COMPOSITION

This application claims benefit under 35 USC 119(e) of U.S. provisional application No. 60/442,636, filed Jan. 24, 2003.

The invention relates to antistatic polymer compositions comprising a) a polymer substrate selected from the group consisting of the polyolefins, polyesters, polyamides and polylactic acids and b) a combination of i) at least one permanent antistatic additive selected from the group consisting of the polyetheresteramides and ii) at least one migratory antistatic additive selected from the group consisting of the alkylsulfonic acid salts, the alkyl diethanolamines and the alkyl diethanolamides. The invention also relates to the antistatic additive mixture of components i) and ii) itself and to a method for the preparation of the antistatic polymer substrates by the incorporation therein of components i) and ii).

BACKGROUND OF THE DISCLOSURE

Polymers are subject to a strong electrostatic charge which when applied, can be discharged only slowly due to low electrical conductivity. Rapid discharging is desirable for example for reasons of safety and aesthetics. Adverse effects of static charge build-up include the soiling of polymer surfaces, electrical shocks to persons touching polymers, disruption of production caused by the adhesion of film webs, destruction of electronic components, lump formation in polymer powders, and sparking followed by ignition, which may result in serious explosions.

Further details relating to antistatic additives and the mechanism of static charging may be found, for example, in the "Plastics Additives Handbook", editors R. Gaechter and H. Mueller, Hanser Publishers, 4th edition, 1993, pages 749-773.

U.S. Pat. No. 3,839,245 discloses antistatic polyamides, polyesters and polyolefins that comprise aliphatic polyetheresteramides.

U.S. Pat. Nos. 4,230,838 and 4,332,920 teaches a method for the preparation of moldable and extrudable aliphatic polyetheresteramides.

U.S. Pat. No. 5,096,995 discloses polyetheresteramides with aromatic backbones.

U.S. Pat. Nos. 5,604,284, 5,652,326 and 5,886,098 disclose antistatic thermoplastic resin compositions comprising a certain polyetheresteramide additive.

GB 2112795 and GB 2112789 disclose the use of aliphatic polyetheresteramide additives in polyolefins.

GB 1518060 teaches antistatic polyetheresteramide fibers and filaments.

U.S. Pat. No. 5,965,206 discloses compositions comprising thermoplastic or elastomeric polymer substrates and an antistatic mixture in the form of contiguous fibers. A component of the antistatic fibers may be for example polyetheresteramides.

U.S. Pat. No. 5,140,065 discloses pigment-compatible thermoplastic molding compositions that comprise a block polyetherpolyamide, a block polyetheresterpolyamide, an amorphous copolyamide and a modified copolyolefin.

WO 02/055411 teaches antistatic flexible intermediate bulk containers. The containers are prepared with polyolefin fibers which contain a polyetheresteramide or a polyesterether block copolymer as an antistatic additive.

JP09040855 teaches combinations of antistatic agents in polycarbonate.

It has been found that polymer substrates are made effectively antistatic by the incorporation therein of at least one permanent antistatic agent selected from the group consisting of the polyetheresteramides, and at least one migratory antistatic agent selected from the group consisting of the alkylsulfonic acid salts, the alkyl diethanolamines and the alkyldiethanolamides.

DETAILED DISCLOSURE

Disclosed are antistatic polymer compositions comprising
a) a polymer substrate selected from the group consisting of the polyolefins, polyesters, polyamides and polylactic acids and
b) a combination of
  i) at least one permanent antistatic additive selected from the group consisting of the polyetheresteramides and
  ii) at least one migratory antistatic additive selected from the group consisting of the alkylsulfonic acid salts, the alkyl diethanolamines and the alkyldiethanolamides.

The present antistatic additive mixture of components i) and ii) is synergistic towards providing antistatic activity to the polymer substrate.

Polymer Substrates

The present antistatic polymer compositions comprise a polymer substrate selected from the group consisting of the polyolefins, polyesters, polyamides and polylactic acids. For example, the polymer component of the present compositions consists essentially of at least one polymer selected from the group consisting of the polyolefins, polyesters, polyamides and polylactic acids. For example, the polymer component of the present compositions consists entirely of at least one polymer selected from the group consisting of the polyolefins, polyesters, polyamides and polylactic acids.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (Du-Pont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/ propylene copolymers, linear low density polyethylene (LL-DPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/ isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ ethylene-acrylic acid copolymers (EAA), LLDPE/EVA, LLDPE/EAA and alternating or random polyalkylene/carbon monoxide copolymers and mixtures thereof with other polymers, for example polyamides.

Polyolefins of the present invention are for example polypropylene homo- and copolymers and polyethylene homo- and copolymers. For instance, polypropylene, high density polyethylene (HDPE), linear low density polyethylene (LLDPE) and polypropylene random and impact copolymers.

Examples of polyesters are polymers derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN), for example polyethylene naphthalate and polyhydroxybenzoates, as well as block copolyether esters derived from hydroxyl-terminated polyethers; and also polyesters modified with polycarbonates or MBS.

The polyesters which may be used in the compositions of this invention include linear, thermoplastic, crystalline or amorphous polyesters produced by conventional polymerization techniques from one or more diols and one or more dicarboxylic acids. For instance, polyesters comprise at least about 50 mole percent terephthalic acid residues and at least about 50 mole percent ethylene glycol and/or 1,4-cyclohexanedimethanol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain e.g., diethylene glycol, triethylene glycol, dipropylene glycol, tripropylene glycol and the like. In general, these diols contain 2 to 18, for instance 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, functional acid derivative thereof such as the dimethyl, diethyl, or dipropyl ester of the dicarboxylic acid are often employed. The anhydrides or acid halides of these acids also may be employed where practical.

The linear polyesters may be prepared according to procedures well known in the art. For example, a mixture of one or more dicarboxylic acids, for instance aromatic dicarboxylic acids, or ester forming derivatives thereof, and one or more diols may be heated in the presence of esterification and/or poly-esterification catalysts at temperatures in the range of 150° to 300° C. and pressures of atmospheric to 0.2 mm Hg. Normally, the dicarboxylic acid or derivative thereof is esterified or transesterified with the diol(s) at atmospheric pressure and at a temperature at the lower end of the specified range. Polycondensation then is affected by increasing the temperature and lowering the pressure while excess diol is removed from the mixture. Solid state polymerization may be employed to achieve final polymer I.V. in a useful range for films and molded containers.

Examples of polyamides are polymers and copolymers derived from diamines and dicarboxylic acids and/or from aminocarboxylic acids or the corresponding lactams, for example polyamide 4, polyamide 6, polyamide 6,6, polyamide 6,10, polyamide 6,9, polyamide 6/12, polyamide 4,6, polyamide 12,12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Polyamides included are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The term "substantially equimolar" proportions includes both strictly equimolar proportions and slight departures therefrom which are involved in conventional techniques for stabilizing the viscosity of the resultant polyamides. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

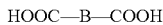

HOOC—B—COOH wherein

B is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 6,6 (polyhexamethylene adipamide), 11, 12, 4,6, 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 4,6, 6,6, 6,9, 6,10, 6,12, 11 and 12, most preferably polyamide-6,6.

Polylactic acids are polymers and copolymers as disclosed in U.S. Pat. Nos. 5,447,962, 5,484,881, 6,114,495 and 6,214,967, the relevant disclosures of which are hereby incorporated by reference.

Polylactic acid or a copolymer of lactic acid and hydroxycarboxylic acid for use in the invention is prepared by using lactic acid or lactide, namely a cyclic dimers of lactic acid, and hydroxycarboxylic acid as raw materials.

Exemplary hydroxycarboxylic acids include glycolic acid, hydroxybutyric acid, hydroxyvaleric acid, hydroxypentanoic acid, hydroxycaproic acid and hydroxyheptanoic acid. Specially, glycolic acid, 3-hydroxylactic acid, 4-hydroxylactic acid, 3-hydroxyvaleric acid or 6-hydroxy caproic acid is used preferably. In certain cases, other monomers can be suitably used as a mixture.

The lactic acid polymer may be prepared directly from lactic acid by dehydrating polycondensation or may be prepared by ring-opening polymerization of lactide.

When a low molecular weight polymer is permitted, the polymer is obtained by dehydrating condensation of lactic acid. When a high molecular weight polymer is required, the polymer is preferably obtained by ring-opening polymerization of lactide.

Lactides which can be used for the ring-opening polymerization are L-lactide, D-lactide, meso-lactide and a mixture of these lactides. A mixture of D- or L-lactide with a lactide having opposite optical activity is preferred. Mixing ratios, D- or L-lactide/optical antipode are between for example 95/5 to about 50/50.

By polymerizing the pure optical isomers or different blends, polymers may be obtained which have different stereochemical structures, affecting their resilience and crystallinity and also their mechanical and thermal properties.

The polymerization degree of lactic acid-base polymer is for example in the range of from about 150 to about 20,000.

Polymerization can be carried out in the presence or absence of a solvent. In view of solvent recovery problem, bulk polymerization without solvent is preferred in industry.

A process for preparing lactic acid-based polymer by ring-opening polymerization of lactide and glycolide will be exemplified hereinafter.

The ring-opening polymerization is carried out in the presence of a catalyst. Catalysts which can be used are generally chloride or carboxylate of zinc or tin and include, for example, stannous octoate, tin tetrachloride, zinc chloride, titanium tetrachloride, iron chloride, boron trifluoride ether complex, aluminium chloride, antimony trifluoride, lead oxide and other polyvalent metal containing compounds. No particular restriction is imposed upon the polyvalent metals. Tin compounds and zinc compounds are preferably used. However, in the case of using the foam for biocompatible materials and food products, these metals must be selected in view of toxicity.

The amount of the catalyst used is for example in the range of from 0.001 to 0.1% by weight for lactide or for the total weight of lactide and glycolide.

Known chain extenders can be used for the polymerization. Preferred chain extenders are higher alcohols such as lauryl alcohol and hydroxy acids such as lactic acid and glycolic acid. The polymerization rate increases in the presence of a chain extender and the polymer can be obtained within a short time. The molecular weight of the polymer can also be controlled by varying the amount of the chain extender. However, too much of the chain extender tends to decrease the molecular weight of polymer formed. Hence, the amount of the chain extender is preferably 0.1% by weight or less for lactide or for the total weight of lactide and glycolide.

Polymerization or copolymerization can be carried out in the presence or absence of a solvent. Bulk polymerization in a molten state of lactide or glycolide is preferably carried out in order to obtain high molecular weight polymer.

In the case of molten polymerization, the polymerization temperature may be generally above the melting point (around 90° C.) of the monomer, lactide or lactide and glycolide. In the case of solution polymerization which uses solvents such as chloroform, polymerization can be carried out at temperatures below the melting point of lactide or lactide and glycolide. In any case, polymerization temperatures above 250° C. are unfavorable because decomposition of the formed polymer may develop.

Polyetheresteramides

The polyetheresteramides of the present invention are known in the art, and are for example selected from the aliphatic and aromatic polyetheresteramides disclosed in U.S. Pat. Nos. 3,839,245; 4,230,838; 4,332,920; 5,096,995; 5,604,284; 5,652,326; and 5,886,098, the disclosures of which are hereby incorporated by reference.

Aliphatic polyetheresteramides are for example those disclosed in U.S. Pat. Nos. 3,839,245; 4,230,838 and 4,332,920.

Aromatic polyetheresteramides are for example those disclosed in U.S. Pat. Nos. 5,096,995; 5,604,284; 5,652,326; and 5,886,098.

In a general sense, the polyetheresteramides known in the art and of this invention comprise polyamide and polyether segments linked together with ester groups. They are prepared for example from polyamines, polybasic carboxylic acids and polyoxyalkylene glycols. In the simplest sense, they are a copolymer of a polyamide with carboxylic end groups (a dicarboxylic polyamide) and a polyoxyalkylene glycol.

The aromatic polyetheresteramides are described similarly, and additionally comprise an aromatic portion. For the purposes of this invention, "aromatic" polyetherester amides are those where an aromatic portion is introduced as part of the polyether (polyol) segment, for example through a bisphenol (infra).

Polyamides with carboxylic end groups are prepared by conventional methods, for example by the polycondensation of a lactam, polycondensation of an amino acid or the polycondensation of a diacid and a diamine. Carried out in the presence of an excess of an organic diacid, these polycondensations produce polyamides with carboxylic end groups.

The polyamides are prepared for example from lactams or amino acids of from 4 to 14 carbon atoms.

Examples of lactams are caprolactam, oenantholactam, dodecalactam, undecanolactam, dodecanolactam, caprylolactam and laurolactam.

Examples of amino carboxylic acids are ω-amino caproic acid, ω-aminoenanthic acid, ω-aminocaprylic acid, ω-aminoperalgonic acid, ω-aminocapric acid, 11-amino-undecanoic acid and 12-aminododecanoic acid.

The polyamide may be the product of the condensation of a dicarboxylic acid and a diamine such as polyamide 6,6, 6,9, 6,10, 6,12, and 9,6; the products of hexamethylenediamine with adipic acid, azelaic acid, sebacic acid, 1,12-dodecanedioic acid and of nonamethylene diamine with adipic acid.

Suitable diamines include ethylenediamine, propylenediamine, tetramethylenediamine, pentamethylenediamine, hexamethylenediamine, heptamethylene diamine, octamethylene diamine, decamethylenediamine, hexadecamethylenediamine, 3,4,5-trimethylhexamethylenediamine, dimer diamine (diamines of dimeric acids obtained by the polymerization of oleic acid or similar unsaturated acids), p-xylylenediamine, p-phenylenediamine, 1-methyl-2,4-diaminobenzene, N,N'-dimethylphenylenediamine, 1,4-diaminocyclohexane, bis-(p-aminocyclohexyl)methane, N,N'-dimethyl-1,4-diaminocyclohexane, piperizine, 2,5-dimethylpiperazine, isophoronediamine, N-oleyl-1,3-diaminopropane, N-coco-1,3-propylenediamine, methyliminobis-propylamine, and the like.

Suitable diacids are carboxylic diacids, for example straight or branched chain aliphatic or cycloaliphatic carboxylic diacids, or aromatic diacids having from 4 to 56 carbon atoms, or example from 6 to 20 carbon atoms, for example succinic acid, adipic acid, suberic acid, glutaric acid, pimelic acid, azelaic acid, sebacic acid, undecanedioic acid, dodecanedioic acid, brassylic acid, thapsic acid, dimer acids obtained by the polymerization of unsaturated fatty acids, terephthalic acid, isophthalic acid, phthalic acid, bibenzoic acid, naphthalene dicarboxylic acid, 3-sulfoisophthalic acid alkali metal salt, 1,4-cyclohexane dicarboxylic acid, dicyclohexyl-4,4'-dicarboxylic acid, and the like. Aromatic diacids may be substituted with one or more other substituents such as halogen, for example chlorine or bromine, or alkyl or alkoxy groups of from 1 to 8 carbon atoms, or sulfoxyl.

The polyether segments are prepared from polyoxyalkylene glycols. Polyoxyalkylene glycols are for example polyethylene glycol and polypropylene glycol.

The polyether segments are linear or branched and are for example polyoxyethylene, polyoxypropylene, polyoxybutylene, polyoxyethylenepropylene, polyoxytetramethylene, polyoxydecamethylene, mixtures thereof, or copolyethers thereof.

The aromatic polyetheresteramides of U.S. Pat. Nos. 5,096,995 5,604,284, 5,652,326 and 5,886,098 are for example prepared in similar fashion to the aliphatic polyetheresteramides described above.

The aromatic polyetheresteramides are similar to the aliphatic polyetheresteramides and additionally comprise at least one aromatic diol.

The additional aromatic diol component is described by the formulae:

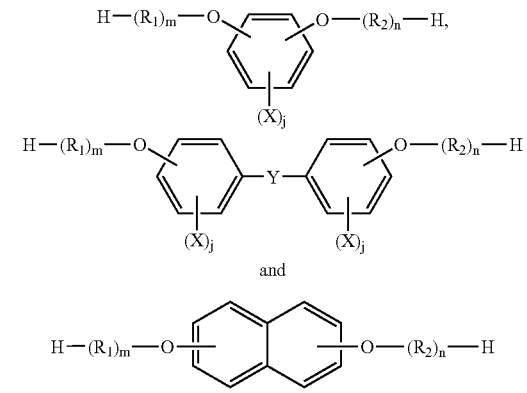

where $R_1$ and $R_2$ independently are ethylene oxide, propylene oxide, butylene oxide, tetramethylene oxide, decamethylene oxide or are co-ethylene/propylene oxide, Y is a covalent bond, an alkylene group of 1 to 6 carbon atoms, an alkylidene group, a cycloalkylidine group, an arylalkylidene group, O, SO, $SO_2$, CO, S, $CF_2$, $C(CF_3)_2$, or NH, X and X' are independently a straight or branched alkyl of 1 to 6 carbon atoms, aralkyl of 6 to 10 carbon atoms, aryl, halogen, sulfonic acid or sulfonic acid salt, j is 0 to 4 and m and n are independently 1 to 68.

The present aromatic diols contain polyoxyalkylene units.

The aromatic polyetheresteramides may be prepared essentially from a polyamide oligomer with carboxylic chain ends and a present aromatic diol containing polyoxyalkylene units.

The polyether segments of the aromatic polyetheresteramides may comprise one or more of the present aromatic diols containing polyoxyalkylene units, or alternatively may comprise at least one of the present aromatic diols and at least one aliphatic polyoxyalkylene glycol.

The aromatic diols of the aromatic polyetheresteramides contain for example bisphenol compounds. That is, they are derived from bisphenol compounds. In this instance the aromatic diols are polyoxyalkylated bisphenols.

Examples of bisphenol compounds are dihydroxydiphenyl, C-alkyl substituted bisphenol; halogenated bisphenol; alkylene bisphenols such as bisphenol F; alkylidene bisphenols such as bisphenol A, cyclohexylidene bisphenol and bistrifluoromethyl methylene bisphenol; aryl alkylidene bisphenol; bisphenol S and hydroxybenzophenone. Specific examples among these compounds are alkylidene bisphenols, for example bisphenol A.

For example, the aromatic polyetheresteramide of the present invention may be the reaction product of the ethylene oxide adduct of bisphenol A with an oligomer with carboxyl chain ends prepared from ε-caprolactam and adipic acid.

The number average molecular weight of the polyoxyalkylene glycol sections (the polyether segments) of the polyetheresteramide copolymers is from about 200 to about 6,000, for example from about 400 to about 3,000. The number average molecular weight of the dicarboxylic polyamide sections (the polyamide segments) is from about 200 to about 15,000, for example from about 300 to about 10,000, or from about 500 to about 5,000.

The polyetheresteramides of component i) may be present at a level from about 0.5% to about 15% by weight, for example from about 1% to about 10% by weight, for instance from about 2% to about 8% by weight, or from about 4% to about 6%, based on the weight of the polymer. For instance, the polyetheresteramides of component i) are present from about 0.5% to about 10%, from about 0.5% to about 8%, or from about 0.5% to about 6% by weight, based on the weight of the polymer. For example, the polyetheresteramides of component i) are present from about 1% to about 15%, from about 2% to about 15%, or from about 4% to about 15% by weight, based on the weight of the polymer. For instance, the polyetheresteramides of comonent i) are present from about 4% to about 8%, based on the weight of the polymer.

It is contemplated that mixtures of aliphatic and aromatic polyetheresteramides may be employed.

Migratory Antistatic Additives

The present alkylsulfonic acid salts comprise straight or branched $C_2$-$C_{22}$ alkyl chains, for example straight or branched $C_{10}$-$C_{18}$ alkyl chains.

Alkyl chains are for example ethyl, propyl, butyl, pentyl, hexyl, heptyl, octyl, nonyl, decyl, undecyl, dodecyl, tetradecyl, hexadecyl, octadecyl, eicosyl, docosyl and tetracosyl and also the corresponding branched isomers.

The cation of the salt is for example an alkali metal cation, alkaline earth metal cation or zinc cation.

For example, the alkali metal cation, alkaline earth metal cation or zinc cation is selected from the group consisting of Li, Na, K, Cs, Ca, Mg, Sr, Ba and Zn. For instance, the cation is selected from the group consisting of Li, Na, K, Ca, Mg and Zn.

The present alkylsulfonic acid salt is for example a mixture of $C_{10}$-$C_{18}$ alkylsulfonic acid sodium salts, CAS # 68037-49-0.

The present alkyl diethanolamines and alkyl diethanolamides comprise straight or branched $C_2$-$C_{22}$ alkyl chains, for example straight or branched $C_{10}$-$C_{19}$ alkyl chains. For example, the present alkyl diethanolamines or alkyl diethanolamides are hydrogenated tallow bis(2-hydroxyethyl)amine, tridecyl bis(2-hydroxyethyl)amine, pentadecyl bis(2-hydroxyethyl)amine, lauryl bis(2-hydroxyethyl)amine, hydrogenated tallow bis(2-hydroxyethyl)amide, tridecyl bis(2-hydroxyethyl)amide, pentadecyl bis(2-hydroxyethyl)amide or lauryl bis(2-hydroxyethyl)amide.

For example, the present alkyl diethanolamide is lauryl bis(2-hydroxyethyl)amide, CAS# 120-40-1 (lauramide diethanolamine).

The present migratory antistatic additives of component ii) are for example single compounds or are any combination of compounds selected from the alkylsulfonic acid salts, the alkyl diethanolamines and the alkyldiethanolamides.

The present migratory antistatic additives of component ii) are advantageously employed from about 0.05% to about 2% by weight, for instance from about 0.1% to about 2% by weight, for example from about 0.05% to about 1% by weight, for instance from about 0.1% to about 1% by weight, based on the weight of the polymer.

The weight ratio of components i) to ii) is for example from about 1:1 to about 150:1, for instance from about 2:1 to about 100:1, for example from about 4:1 to about 80:1, for instance from about 10:1 to about 50:1.

The present polymer compositions can contain further additives. These additional additives are mainly from the group of heat stabilizers and/or light stabilizers. The thermal stabilization embraces both processing and use (long-term stability). Said additives are known to the skilled person and most of them are commercially available.

Suitable additional additives are for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl- 5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecyldmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl) pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl) -hexahydro-1,3,5-triazine, 1,3,5-tris(3,5-dicyclohexyl-4-hydroxybenzl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl] oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hyroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl-5-chloro-benzotriazole, 2-(3'-tert-butyl-2'-hydroxy-5-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxy-carbonylethyl)phenyl)benzotriazole, 2-(3'-tert-butyl-2'-hydroxy-5'-(2-octyloxycarbonylethyl)-phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene gylcol 300; [R—CH$_2$CH$_2$—COO—CH$_2$CH$_2$–]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]-benzotriazole.

2.2. 2-Hydroxybenzophenones, for example the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis-(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-amino-propylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dode-cylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl)phosphite (Irgafos® 168, Ciba-Geigy), tris(nonylphenyl)phosphite,

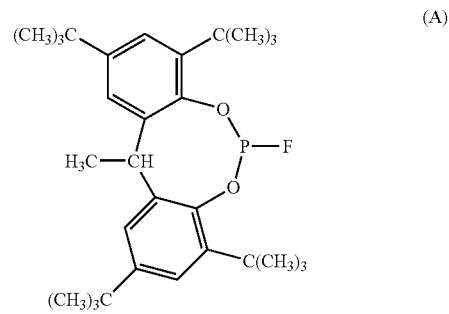

(A)

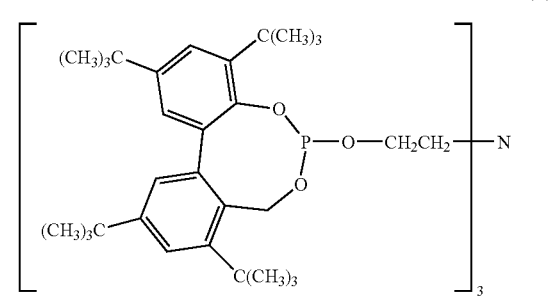

(B)

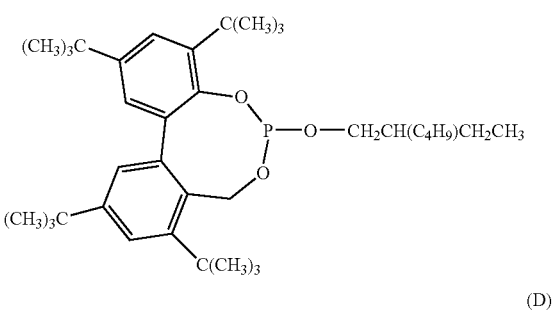

(C)

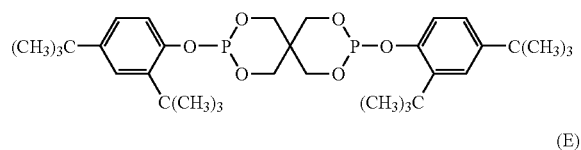

(D)

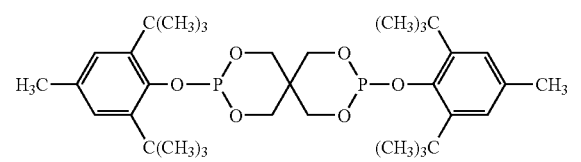

(E)

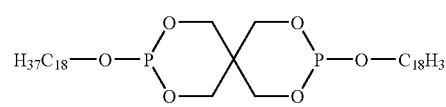

(F)

-continued

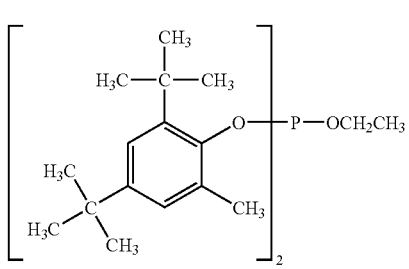

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.
6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.
7. Thiosynergists, for example dilauryl thiodipropionate or distearyl thiodipropionate.
8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.
9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zink pyrocatecholate.
11. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).
12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

Suitable lubricants are for example:
montan wax, fatty acid esters, PE waxes, amide waxes, polyol partial esters, partially saponified PE waxes, so-called complex ester chloroparaffins, glycerol esters, alkaline earth metal soaps or fatty ketones, such as described in DE4204887. Suitable lubricants are also described in "Taschenbuch der Kunststoffadditive", editors R. Gächter and H. Müller, Hanser Verlag, 3$^{rd}$ edition, 1990, pages 443-503. Other lubricant embodiments, in particular combinations of lubricants, are to be found in EP 0062813 and EP 0336289.

The present invention also relates to an antistatic additive mixture comprising
  i) at least one permanent antistatic additive selected from the group consisting of the polyetheresteramides and
  ii) at least one migratory antistatic additive selected from the group consisting of the alkylsulfonic acid salts, the alkyl diethanolamines and the alkyl diethanolamides.

The present invention also relates to a process for the preparation of antistatically finished polymers selected from the group consisting of polyolefins, polyesters, polyamides and polylactic acids,
  which process comprises mixing an additive mixture comprising
  i) at least one permanent antistatic additive selected from the group consisting of the polyetheresteramides and
  ii) at least one migratory antistatic additive selected from the group consisting of the alkylsulfonic acid salts, the alkyl diethanolamines and the alkyl diethanolamides,
  as such or in the form of its individual components and together with optional further additives with said polymers in calenders, mixers, kneaders or extruders.

The compositions of this invention may be prepared by known methods, for example by mixing the cited antistatic additives and optional further additives with the polymer using appliances such as calenders, mixers, kneaders, extruders and the like. The additives can be added singly or in admixture with each other. It is also possible to use masterbatches.

The antistatically finished polymers of the invention may be brought into the desired form by known methods. Such methods are, for example, calendering, extruding, spray coating, spinning, compression melting, rotational casting, thermoforming or extrusion blowing. The antistatically finished polymer can also be processed into foamed articles.

The finished antistatic polymer articles are for example fibers, films, molded articles and foamed articles.

The following Examples illustrate the invention in more detail. Unless otherwise stated, parts and percentages are by weight.

EXPERIMENTAL

Polymer resin is blended with antistatic additives by using a Turbula mixer for 15-20 minutes. Total formulation size was 1000 g. The mixtures are then extruded with a 27 mm Leistritz twin screw extruder. The extrusion is conducted at 425-475° F. for LDPE, 390-410° F. for PP, and 320-375° F. for PLA. The obtained resin is pelletized with a cutter. MPM blown film extruder is then employed to make film from LDPE and PP pelletized resin. PLA resin is injection molded into plaques. PP fiber is spun from the pelletized PP resin by using a Hills Fiber Extruder. The spun fiber is about 15 dpf.

Static decay time is measured with ETS (electro-tech systems) Static Decay Meter on LDPE and PP films and PLA plaques. Results are in the tables below. The measurement of 100 sec is poor. A measurement of >100 sec is recorded as 100 sec.

Surface Resistivity is measured in ohms/sq. The lower the value the more conductive the sample is.

Antistatic additives:
Migratory:
Additive M1: mixture of $C_{10}$-$C_{18}$ alkylsulfonic acid sodium salts, CAS # 68037-49-0
Additive M2: lauryl bis(2-hydroxyethyl)amide, CAS# 120-40-1
Permanent:
Additive P1: hexanedioic acid, polymer with azacyclotridecan-2-one and α-hydro-ω-hydroxypoly(oxy-1,2-ethanediyl) CAS# 70290-02-7
Additive P2: 47% hexanedioic acid, polymer with azacyclotridecan-2-one and α-hydro-ω-hydroxypoly(oxy-1,2-ethanediyl) CAS# 70290-02-7; 50% azacyclotridecan-2-one, homopolymer, CAS# 25038-74-8; and 2% perchloric acid, sodium salt, monohydrate CAS# 7791-07-3

The additive level is weight percent based on the entire formulation.

Polypropylene (PP) film

| antistatic additive | Static Decay Time (seconds) | | |
|---|---|---|---|
| | initial | 1 week | 4 weeks |
| none | 100 | 100 | 100 |
| 1% M1 | 100 | 18.3 | 0.67 |
| 4% P1 | 100 | 100 | 100 |
| 8% P1 | 100 | 100 | 100 |
| 4% P2 | 100 | 100 | 100 |
| 8% P2 | 100 | 100 | 100 |
| 1% M1 + 4% P1 | 1.58 | 0.13 | 0.05 |
| 1% M1 + 8% P1 | 0.11 | 0.05 | 0.04 |
| 1% M1 + 4% P2 | 1.22 | 0.10 | 0.07 |
| 1% M1 + 8% P2 | 0.03 | 0.01 | 0.01 |

Polypropylene (PP) fiber

| antistatic additive | Surface Resistivity (ohms/sq) | | | |
|---|---|---|---|---|
| | initial | 1 day after first wash | 1 day after second wash | 7 weeks after second wash |
| none | 5.8E+09 | 1.0E+15 | 8.9E+14 | 1.0E+15 |
| 1% M1 | 5.7E+09 | 5.5E+14 | 1.8E+15 | 4.7E+14 |
| 1% M2 | 5.4E+09 | 3.2E+14 | 1.9E+15 | 5.9E+14 |
| 5% P2 | 3.4E+09 | 4.6E+13 | 1.7E+14 | 1.2E+14 |
| 1% M1 + 5% P2 | 3.0E+09 | 8.9E+12 | 2.7E+13 | 2.3E+12 |
| 1% M2 + 5% P2 | 4.4E+09 | 4.6E+12 | 5.3E+12 | 4.1E+12 |

Polylactic acid (PLA) plaques

| antistatic additive | Static Decay Time (seconds) | | | | |
|---|---|---|---|---|---|
| | 1 day | 5 days | 2 weeks | 1 month | 2 months |
| none | 100 | 100 | 100 | 100 | 100 |
| 1.0% M1 | 100 | 0.75 | 0.74 | 0.50 | 0.64 |
| 4% P2 | 100 | 100 | 100 | 100 | 100 |
| 1% M1 + 4% P2 | 3.10 | 1.32 | 0.96 | 0.78 | 0.82 |

Low Density Polyethylene (LDPE) film

| antistatic additive | Static Decay Time (seconds) | | | | |
|---|---|---|---|---|---|
| | 7 days | 14 days | 1 month | 2 months | 4 months |
| none | 100 | 100 | 100 | 100 | 100 |
| 0.05% M1 | 100 | 100 | 100 | 100 | 100 |
| 0.2% M1 | 100 | 100 | 100 | 100 | 100 |
| 4% P2 | 100 | 100 | 100 | 100 | 100 |
| 6% P2 | 100 | 8.85 | 5.81 | 100 | 2.53 |
| 0.05% M1 + 4% P2 | 0.79 | 0.29 | 0.24 | 0.88 | 0.26 |
| 0.2% M1 + 4% P2 | 0.04 | 100 | 0.04 | 0.08 | 0.03 |
| 0.05% M1 + 6% P2 | 0.31 | 0.07 | 0.15 | 0.04 | 0.10 |
| 0.2% M1 + 6% P2 | 0.02 | 0.02 | 0.02 | 0.02 | 0.02 |

What is claimed is:

1. An antistatic polymer composition comprising
    a) a polymer substrate selected from the group consisting of polyolefins, polyesters, polyamides and polylactic acids and
    b) a combination of
        i) at least one permanent antistatic additive selected from the group consisting of polyetheresteramides and
        ii) at least one migratory antistatic additive selected from the group consisting of straight or branched chain alkyl diethanolamides.

2. A composition according to claim 1 in which the polyetheresteramides are aliphatic polyetheresteramides.

3. A composition according to claim 1 in which the polyetheresteramides are aromatic polyetheresteramides.

4. A composition according to claim 2 wherein the polyetheresteramide consists essentially of residues derived from (1) a polyamide oligomer having carboxylic end groups and having a number average molecular weight of from about 200 to about 15,000 and (2) a polyoxyalkylene glycol having a number average molecular weight of from about 200 to about 6,000.

5. A composition according to claim 4 where the carboxylic group is derived from adipic, sebacic, terephthalic or isophthalic acids or 3-sulfoisophthalic acid alkali metal and the polyoxyalkylene glycol is polyethylene glycol.

6. A composition according to claim 3 wherein the polyetheresteramide consists essentially of residues derived from (1) a polyamide oligomer having carboxylic end groups and having a number average molecular weight of from about 200 to about 15,000 and (2) a polyoxyalkylated bisphenol compound having a number average molecular weight of from about 200 to about 6,000.

7. A composition according to claim 6 where the carboxylic group is derived from adipic, sebacic, terephthalic or isophthalic acids or 3-sulfoisophthalic acid alkali metal and wherein the polyoxyalkylated bisphenol compound is a polyoxyalkylated alkylidene bisphenol.

8. A composition according to claim 6 wherein the polyoxyalkylated bisphenol is an ethylene oxide adduct of bisphenol A.

9. A composition according to claim 1 where alkyl is straight or branched chain $C_2$-$C_{22}$ alkyl.

10. A composition according to claim 1 where alkyl is straight or branched chain $C_{10}$-$C_{18}$ alkyl.

11. A composition according to claim 1 where the alkyl diethanolamides are hydrogenated tallow bis(2-hydroxyethyl)amide, tridecyl bis(2-hydroxyethyl)amide, pentadecyl bis(2-hydroxyethyl)amide or lauryl bis(2-hydroxyethyl)amide.

12. A composition according to claim 1 where the migratory additive is lauryl bis(2-hydroxyethyl)amide, CAS# 120-40-1.

13. A composition according to claim 1 where the polymer substrate is polyethylene, polypropylene, polyethylene/polypropylene copolymer, polyethylene terephthalate, polybutylene terephthalate, polyethylene naphthalate, polyamide 4, polyamide 6, polyamide 6,6, polyamide 6,10, polyamide 6,9, polyamide 6,12, polyamide 4,6, polyamide 12,12, polyamide 11, polyamide 12 and polylactic acid.

14. A composition according to claim 1 where the polyetheresteramides of component i) are present from about 0.5% to about 15% by weight, based on the weight of the polymer substrate.

15. A composition according to claim 1 where the polyetheresteramides of component i) are present from about 1% to about 10% by weight, based on the weight of the polymer substrate.

16. A composition according to claim 1 where the migratory additives of component ii) are present from about 0.05% to about 2% by weight, based on the weight of the polymer substrate.

17. A composition according to claim 1 where the migratory additives of component ii) are present from about 0.05% to about 1% by weight, based on the weight of the polymer substrate.

18. An antistatic additive mixture comprising
   i) at least one permanent antistatic additive selected from the group consisting of polyetheresteramides and
   ii) at least one migratory antistatic additive selected from the group consisting of straight or branched chain alkyl diethanolamides.

19. A process for the preparation of antistatically finished polymers selected from the group consisting of polyolefins, polyesters, polyamides and polylactic acids,
   which process comprises mixing an additive mixture comprising
      i) at least one permanent antistatic additive selected from the group consisting of polyetheresteramides and
      ii) at least one migratory antistatic additive selected from the group consisting of straight or branched chain alkyl diethanolamides,
   as such or in the form of its individual components and together with optional further additives with said polymers in calenders, mixers, kneaders or extruders.

* * * * *